Feb. 27, 1951 C. H. WELLS ET AL 2,543,143
TRUCK PARTITION
Filed June 18, 1947 2 Sheets-Sheet 1

Inventor
C. H. Wells
W. E. Wells
By Arthur H. Sturges
Attorney

Feb. 27, 1951 — C. H. WELLS ET AL — 2,543,143
TRUCK PARTITION
Filed June 18, 1947 — 2 Sheets-Sheet 2
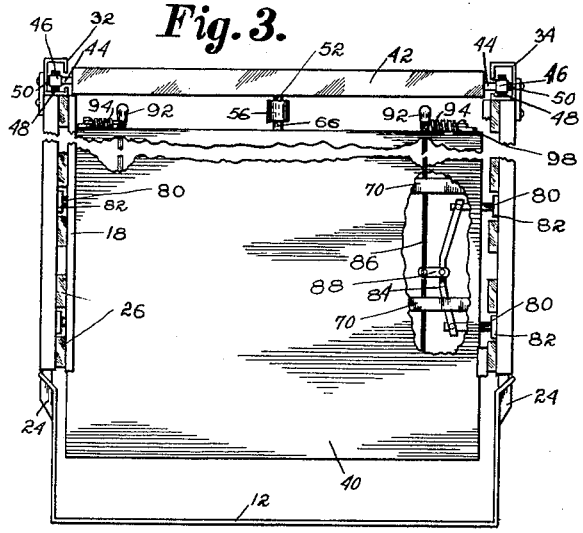
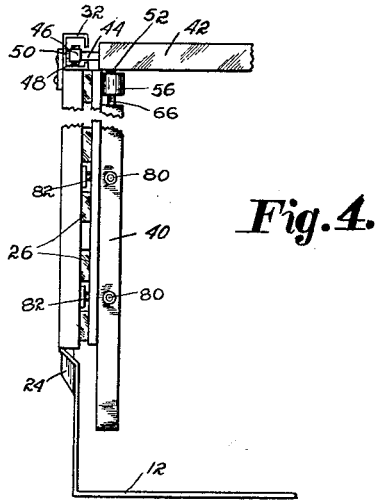
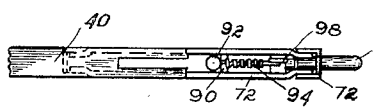
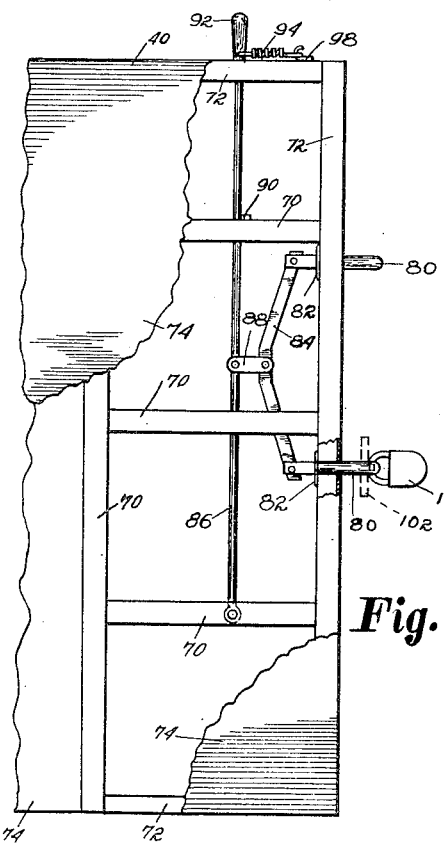
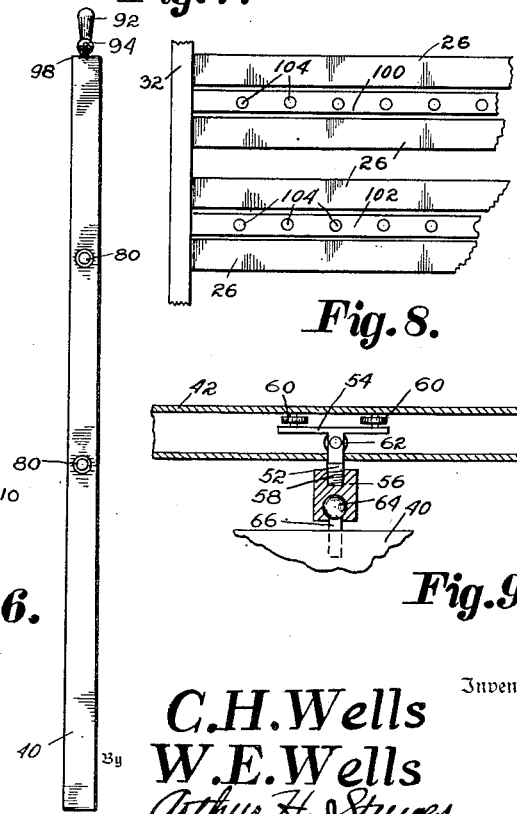
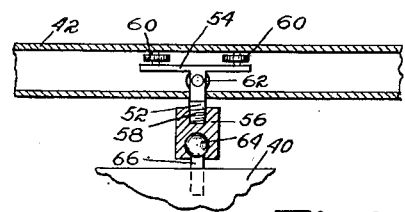
Inventor
C. H. Wells
W. E. Wells
Arthur H. Sturges Attorney Patented Feb. 27, 1951

2,543,143

UNITED STATES PATENT OFFICE 2,543,143

TRUCK PARTITION

Charles H. Wells and Walter E. Wells, Omaha, Nebr., assignors to Wells Adjusto Gate Co., Omaha, Nebr., a corporation of Nebraska Application June 18, 1947, Serial No. 755,282

3 Claims. (Cl. 296—28)

The present invention relates to the transportation art and more particularly to trucks, railroad cars and the like, which are adapted for transporting merchandise therein and particularly livestock.

It is an object of the invention to provide a device which may be readily applied to the body of a stock truck or the like for dividing the latter into compartments whereby stock may be confined in a restricted area or portion of a truck body for transportation.

Another object of the invention is to provide a device for the above stated purpose which is so constructed that a partition may be readily swung into position for use or stored against the walls of a truck body and in parallelism with a wall of the latter when not in use.

Other and still further objects and advantages of the invention will be understood from the following detailed description of a preferred embodiment thereof.

In the drawings:

Figure 3 is a rear elevation of the stock carrying portion of the truck of Figure 1, portions of the partitioning door of the invention and of the stock truck being broken away;

Figure 4 is a rear elevation of a portion of the partitioning device of the invention and a broken away portion of the stock truck of Figure 1, parts of the device and of the truck being broken away, the partitioning door of the invention being shown in the position preferred when the door is not in use.

Figure 5 is a top plan view of an end section of the partitioning door of the invention a cover thereof being broken away for showing the lock mechanism therein;

Figure 6 is a side elevation of the partitioning door of the invention, a cover thereof being broken away for displaying the lock mechanism therein, a padlock being shown as disposed through the end of one of the latches thereof, and an apertured bar employed for receiving a latch of the invention being shown in dotted lines;

Figure 7 is a side elevation of the partitioning door of Figure 6;

Figure 1:
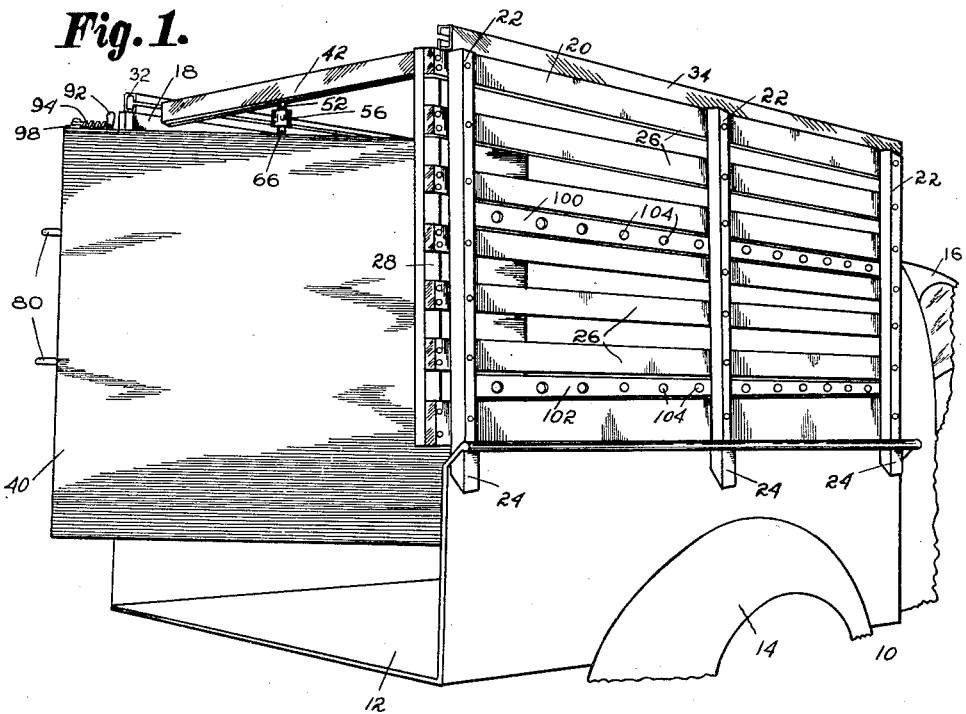
Figure 1 is a perspective view of the new device shown as applied to a stock-truck, portions of the latter being broken away.

Figure 8 is a detailed side elevation of a portion of the side wall of the truck shown in Figure 1, particularly showing a pair of apertured bars employed for receiving the latches of the locking mechanism of the invention; and Figure 9 is a detailed sectional view of a slidably attached universal connection used to interconnect the door and track-bar of the invention, parts of the door and track-bar being broken away and other parts showing in section.

The partitioning device of this invention is for separating or partitioning a desired fractional portion of the storage space having two oppositely disposed walls. The invention is particularly adapted for use in partitioning stocktrucks, railroad cars, and the like such as the stock-truck shown in Figure 1.

Figure 2:
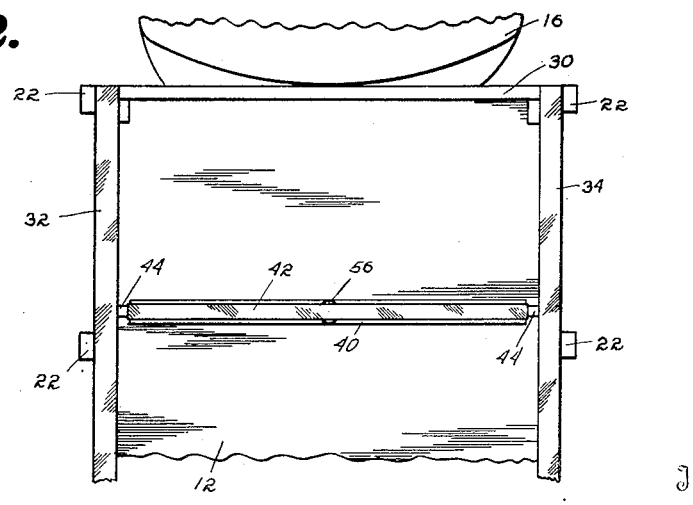
Figure 2 is a detailed top-plan view of a midsection of the stock truck of Figure 1 showing the partitioning door of the invention in a position for forming a back wall for a minor portion of the stock carrying space.

The stock-truck of Figure 1 is generally indicated at 10 having a carrying platform 12, fender 14, and cab 16. The truck 10 is one of a type having two oppositely disposed walls shown at 18 and 20 for partially enclosing a storage or stock-carrying space. The walls 18 and 20 may be permanent or of the extension type. An extension type wall is illustrated in Figure 1 and comprises a plurality of vertical braces 22, each mounted at their lower ends in a suitable socket 24 formed in the upper end of the sides of the carrying platform 12. Such walls are conventional and also include horizontally disposed slats 26 suitably secured to and transversely disposed with respect to the upright supports 22. At their rearward ends the slats 26 of each of the walls 18 and 20 are secured to upright interconnecting braces 28. Conventional stock-trucks are further provided with a forward wall, best shown in Figure 2 at 30.

The partitioning device of this invention includes two parallel rails or tracks 32 and 34, each suitably secured to a respective one of the walls 18 and 20. The tracks 32 and 34 are preferably longitudinally disposed and are suitably attached to the top or adjacent the top of the walls 18 and 20.

The tracks 32 and 34 are preferably of C-shape in cross-section, the open side of the C being disposed inwardly of the walls 18 and 20. In other words, a cross-section of one of the tracks 32 and 34 is in the form of an annular rectangle, having a rectangular opening extending longitudinally thereof its center and having a slot extending through the side of the rectangle, the slots extending longitudinally of the tracks 32 and 34 on the oppositely disposed faces of the latter.

It will be seen that the tracks 32 and 34 may be constructed in other forms if desired, although, preferably, the above described form is used.

A partitioning door 40 is employed for separating the storage space enclosed by the walls 18 and 20 into two separate sections of desired size. The door 40 is slidably attached to and suspended from the tracks 32 and 34 for longitudinal movement with respect to the latter preferably by means of a track-bar 42, the latter being channel-shape in cross section and transversely disposed with respect to the tracks 32 and 34.

The track-bar 42 is attached at each of its ends respectively to one of a pair of rods 44 as best shown in Figure 3. The rods 44 extend outwardly from the ends of the bar 42 in longitudinal alignment therewith. At the outer ends of each of the rods 44 one of two suitable roller-brackets 46 are attached. The latter may be constructed in any desired manner but are preferably provided with two rollers 48 which are adapted to rotate in a vertical plane across the lower inside surface of the track-bars 32 and 34. A further roller 50 is pivotally attached to the outer side of each of the roller-brackets 46, and the rollers 50 are adapted to rotate in a horizontal plane for bearing against the outermost inside surface of each of the tracks 32 and 34.

The track-bar 42 is preferably of a similar shape in cross-section to the tracks 32 and 34 except that the longitudinal slot in the track-bar 42 is disposed downward for the purpose of permitting the movement of a vertically disposed bolt 52 therethrough. The latter is best shown in Figure 9 and serves the purpose of interconnecting a third roller bracket 54 with a pivotal member or universal joint socket member 56, the bolt 52 being threadedly engaged in a threaded recess 58 in the upper side of the socket member 56.

The roller-bracket 54 is preferably of a T-shape in side elevation as best shown in Figure 9 and is provided with two horizontally rotating wheels 60 which are pivotally attached to the bracket 54 and are adapted to bear against the vertically disposed sides of the track-bar 42. A roller 62 is secured to the bracket 54 in a position for rotating in a vertical plane and for bearing against the lower inside surfaces of the track-bar 42.

The universal joint socket member is preferably of cylindrical shape and is provided with a spherical socket 64 in the lower side thereof, the latter being opened at its lower side for receiving a bolt 66. The latter is provided with a ball-shaped upper end in snug rotatable engagement with the walls of the socket 64. The lower end of the bolt 66 is suitably secured in the upper side of the later described frame-work of the door 40.

The door 40 is preferably constructed of a plurality of horizontal and vertical frame members 70 which are bound on their outer sides by other frame members 72, and the latter are preferably in the shape of a rectangle, the sides of which are normally vertically disposed. The frame of the door 40 is provided with a cover 74 on both sides thereof and attached thereto.

A locking mechanism employed for securing the door 40 in a desired position with respect to the walls 18 and 20 includes one or more, and preferably a pair of latch bolts or latches 80 extending outwardly from each of the vertical edges of the door 40. The latches 80 are slidably disposed through the vertically disposed frame members 72 of the door 40 and each latch of a pair are spaced apart. Each latch 80 is provided with an attached flange 82 on the inward side of the adjacent frame member 72 for the purpose of bearing against the latter to prevent the latter from protruding excessively from the vertical side of the door 40. The inward ends of the latches 80 of each pair are suitably secured to one of two interconnecting bars 84 and each of the latter are pivotally secured at their centers to one of a pair of vertically disposed handle rods 86 by means of links 88.

The handle rods 86 are pivotally secured at their lower ends to one of the horizontally disposed frame members 70 of the door 40 and each at a point spaced inwardly from the adjacent vertical edge of the door and spaced downwardly from the respective link 88. Two of the horizontally disposed frame members 70 which are disposed upwardly from the links 88 are each provided with a detent 90 attached thereto, for the purpose of preventing excessive movement of the handles 86 in directions toward the adjacent edges of the door 40. The upper end of the handle rods 86 are preferably flared outwardly and rounded for providing handles 92.

Two springs 94 or other resilient means are each secured to one of its ends to a handle rod 86 and is secured at its other end to the door 40 by suitable hooks 98 which latter are each disposed between the respective handle rod 86 and the adjacent vertical edge of the door 40 so that the springs tend to draw the handle rods 86 toward said edges for urging the latches 80 into an engagement with later described apertured bars.

The said apertured bars are best shown in Figure 8 at 100 and 102 and are spaced apart similarly to the latches 80. Each side, 18 and 20, of the truck 10 is provided with an upper bar 100 and a lower bar 102 which are securedly attached to the upright side frame members 32. The bars 100 and 102 are each provided with a row of spaced detents or openings 104 each of sizes for receiving the latches 80.

In operation, the partitioning door is in a position parallel with and disposed against one of the walls 18 and 20 when not in use, as best shown in Figure 4. When it is desired to partition the stock-carrying portion of the truck 10, the door 40 may be pulled outwardly from the adjacent wall by sliding the door longitudinally of the track bar 42 through the action of the roller-bracket 54 and the rollers 60 and 63.

The door may then be pivotally turned into a position transverse with respect to the walls 18 and 20 through the pivotal connection provided by the universal joint 56. The operator may then grip the handles 92, pulling inwardly thereon for drawing the latches 80 inwardly of the vertically disposed edges of the door 40. The door 40 may be pushed longitudinally of the walls 18 and 20 and into position for partitioning a desired fraction of the stock carrying space.

When the door is in proper position, the operator may release the handles 92 for permitting the latches 80 to enter the apertures 104 under the urge of the springs 94. When in this position, the stock will be safely corraled in any desired fractional portion of the truck. Should it be desired to secure the stock from theft, a padlock 110, shown in Figure 6, may be employed by inserting its half through a suitable opening in the outer end of one of the latches 80 at a time when the said latch is disposed through an aperture 104 in one of the bars 102.

As thus described it will be seen that this invention has provided a device for attachment to a stock-truck or the like which may be readily swung into position for partitioning the storage space of a truck or may be optionally stored against the walls of the latter when not in use.

From the foregoing description, it is thought to be obvious that a truck partition constructed in accordance with our invention is particularly well adapted for use by reason of the convenience and facility with which it may be assembled and operated, and it will also be obvious that our invention is susceptible of some change and modification without departing from the principles and spirit thereof and for this reason, we do not wish to be understood as limiting ourselves to the precise arrangement and formation of the several parts herein shown in carrying out our invention in practice, except as claimed.

We claim:

1. In combination with the body of a vehicle having oppositely disposed walls, of means for sub-dividing said body into areas of pre-selected size, said means comprising a row of detents carried by at least one of said walls, oppositely disposed rails carried by said walls above said detents, a bar disposed between and supported by said rails, the ends of said bar being slidably mounted on said rails for movement to selected positions with respect to the longitudinal length of said rails, said rails being constructed for guiding such movement, a partition member, a pivotal connection between said member and said bar for suspending one from the other and for permitting said member to turn into positions transverse and parallel with respect to said walls at desired times; means slidably mounting the said pivotal connection on the bar for longitudinal travel of said connection and partition member on the bar, and means cooperative with said detents carried by said partition member for maintaining said partition member in a position transverse with respect to said walls.

2. In a vehicle body partition, the combination which comprises a platform, side walls extended upwardly from the side edges of the platform, tracks, C-shape in cross section, carried by the upper parts of the side walls, a transverse bar channel-shape in cross section extended between the tracks, means movably mounting the ends of the transverse bar in the tracks, a partition in the vehicle body and positioned below the said transverse bar, a bracket positioned between the said partition and transverse bar, means movably mounting the bracket in the bar, means pivotally suspending the partition from the bar whereby with the bracket positioned at one end of the bar the partition may be positioned against the inner surface of a side wall of the vehicle body, and locking means on an edge of said partition positioned to engage a side wall of the vehicle body for retaining the partition in a position extended across the said vehicle body.

3. In a vehicle body partition, the combination which comprises a vehicle body including a platform having upwardly extended side walls, tracks, C-shape in cross section, carried by the upper parts of the side walls, a transverse bar, channel-shape in cross section, extended between the tracks, rollers journaled on the ends of the transverse bar and positioned in the tracks for movably mounting the bar in the tracks, a partition in the vehicle body positioned below the transverse bar, a bracket positioned between the partition and bar, rollers carried by the bracket and positioned in the bar movably mounting the bracket in the bar, a swivel joint pivotally suspending the partition from the bar whereby with the bracket located at one end of the bar the partition may be positioned against the inner surface of the adjacent side wall of the vehicle body, spaced latch bolts slidably mounted in the edges of the said partition, rods having handles thereon pivotally mounted in the partition, means connecting the said latch bolts to the rods whereby the latch bolts may be withdrawn from locking engagement with the side walls of the vehicle body by the rods, and means resiliently urging the said latch bolts into locking engagement with the side walls for retaining the partition in a transverse position in the vehicle body.

CHARLES H. WELLS.
WALTER E. WELLS.

REFERENCES CITED

The following references are of record in the file of this patent:

UNITED STATES PATENTS

| Number | Name | Date |
|---|---|---|
| 233,630 | Lincoln | Oct. 26, 1880 |
| 1,085,753 | Moore | Feb. 3, 1914 |
| 1,505,527 | Belden et al. | Aug. 19, 1924 |
| 1,522,784 | Laffey | Jan. 13, 1925 |
| 1,605,822 | Eldridge | Nov. 2, 1926 |
| 1,646,604 | Wells | Oct. 25, 1927 |
| 1,803,760 | Jones | May 5, 1931 |
| 2,227,807 | Dixon | Jan. 7, 1941 |